United States Patent [19]

Valdespino

[11] 3,995,690
[45] Dec. 7, 1976

[54] WELL POINT SYSTEM

[75] Inventor: Joseph M. Valdespino, Orlando, Fla.

[73] Assignees: R. L. Gould; Stanley Hobbs, both of Winter Park, Fla. ; part interest to each

[22] Filed: Feb. 26, 1976

[21] Appl. No.: 661,831

[52] U.S. Cl. .............................. 166/52; 137/110; 166/54

[51] Int. Cl.² ........................................ E21B 43/00

[58] Field of Search ............... 166/52, 54, 54.1; 137/110

[56] References Cited

UNITED STATES PATENTS

| | | | |
|---|---|---|---|
| 336,997 | 3/1886 | Godfrey | 166/52 |
| 2,013,232 | 9/1935 | Bridenbaugh | 137/110 |
| 2,134,778 | 11/1938 | Clarke | 137/110 |
| 2,271,832 | 2/1942 | Shultz | 166/54 |
| 2,654,434 | 10/1953 | Culleton | 166/52 |
| 2,816,564 | 12/1957 | Wilkerson | 137/110 |

Primary Examiner—James A. Leppink
Attorney, Agent, or Firm—Duckworth, Hobby, Orman, Allen & Pettis

[57] ABSTRACT

A well point system is provided having automatic regulation of the flow of fluid through each riser in order to shut off an individual riser when the water level drops below the well point of that particular riser. The automatic regulation in the flow of water is controlled above the surface of the earth and includes a float actuated valve for preventing the pump from drawing air. The float actuated valve has a float connected to a rocker arm operating two valve seats for closing a pair of ports and also has a controlled air bleed for evacuating the riser and allowing the water to unseat the valve when the water rises around the well point.

21 Claims, 5 Drawing Figures

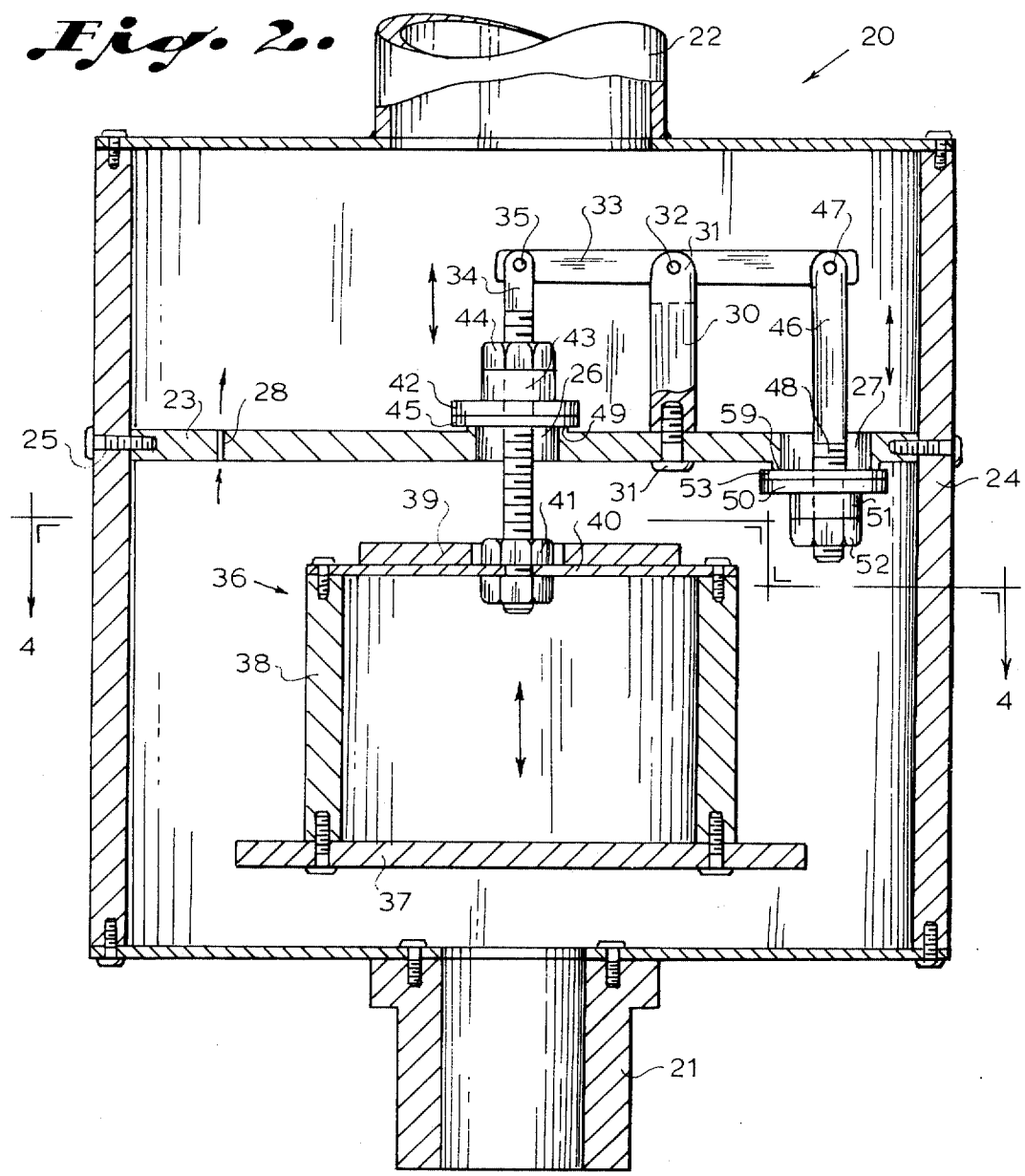

WELL POINT SYSTEM

BACKGROUND OF THE INVENTION

The present invention is related to well point systems and especially to the automatic regulation of the flow of water in a well point system.

It is necessary to de-water a construction area when construction work is being done below the surface of the earth in order to remove all water and other liquids from an excavation area to provide dry working conditions. The most common technique of de-watering an excavation area is to sink a plurality of well points around the area and connect a pump to each of the well points so that the water will be pumped from the area surrounding the excavation. This de-watering method has proven quite satisfactory but presents certain problems. As the well points lower the water table or level, the upper portion of the well points tend to draw air through the system which seriously affects the operation of the pumps. This problem is reduced to some degree by elaborate valving devices and large vacuum pumps, but the present practice still requires a manual closing of tuning valves on a well point header system. This is an especially troublesome problem where the different well points are sunk to different depths surrounding the excavation. In a typical condition with a series of well points evenly spaced and evenly located at the same depths, some of them will have evacuated their immediate area of water while an adjacent well point may not have completely evacuated the water depending upon the soil structure and the liquid yield of the soil. The well points drawing air must be isolated from the header manifolds so that a pumping machine is not allowed to draw air. When such points are isolated it is also important to know when and if the water level rises so that they can be returned to the system. Since each point cannot be constantly monitored, a means for eliminating free air entry from a centrifugal pump had to be devised and a vacuum pump was implemented as an essential part of the rig. Even so, without the practice of manual tuning, the air handling capacity of a well point pump is frequently overcome. In order to overcome these problems, several automatic tuning systems for well point systems have been devised including U.S. Pat. No. 3,815,626 for an apparatus for the automatic regulation of the flow of fluid in which the well point has incorporated therein automatic regulation of the flow of water which operates on a rising and falling float in response to the water levels surrounding the well point. In addition, four U.S. Pat. to T. F. Moore, Nos. 2,176,540; 2,164,253; 2,474,364 and 3,888,605 are directed towards well point systems and to the improvement of well point systems by the use of automatic tuning well points and valves. The first three of these patents teach well point systems which work on floats located in the well point responsive to the level of ground water which actuates the float to block the flow of air when the water level drops below a predetermined level. These prior art automatic tuning well points are, however, located in the well point themselves which then must be drilled deep into the earth, thereby substantially increasing the cost of an individual well point which frequently must be left in the earth and increasing the size and complexity of the well point. By increasing the complexity of the well point located deep in the earth a likelihood of failure of the well point is also increased. It is accordingly one advantage of the present invention that an automatic tuning valve for well points may be located above the earth in the riser between the well point and the manifold to shut off a particular riser and well point when the well point starts drawing air.

The fourth U.S. Pat. No. 3,888,605, deals with a float actuated valve located above the surface of the earth for shutting off individual risers of a well point system. However, in this valve a float is located in the flow of water so that the flow of water from the riser tends to pull the float towards its cutoff position during normal operation thereby interferring with the flow of water through the valve while air passageway by-passes the valve to provide a reduced pressure condition in the pipe when the valve means is closed.

One prior U.S. Pat. No. 3,654,434 teaches an apparatus for drying excavations by providing a float actuated valve for bleeding air in a well point system by locating a valve at the highest point and bleeding air from the manifold of the well point system.

One reason that automatic tuning valves have been located in well points rather than above the earth is because the water level is needed to actuate the flow to shut off the air and more importantly, the water level is needed to re-actuate the flow to turn the well point back on when the water level rises.

SUMMARY OF THE INVENTION

The present invention provides a well point system including a well point pump connected to a manifold, which in turn is connected to a plurality of riser pipes leading into the earth and to well points. A self-tuning well point valve is located above the earth in each riser for turning each well point on and off responsive to the flow of water through the riser. Each self-tuning valve has a casing having an opening in each end thereof for the passage of water therethrough and each valve has a wall located in the casing between the ends of the casing and mounted to the casing. The valve mechanism has a rocker arm which is pivotally mounted to the inside of the casing either to the wall or to the casing and has a float connected to one end of the rocker arm and located on one side of the wall and valve elements located on one or both ends of the rocker arm for closing one or more openings or valve ports through the wall mounted in the casing so that actuation of the float will rock the rocker arm to open or close the valve port. An air bleed for allowing air to escape through the wall is provided whereby only sufficient air is allowed through the wall to allow sufficient pressure to lift the water in a riser to actuate the valve.

BRIEF DESCRIPTION OF THE DRAWINGS

Other objects, features and advantages of the present invention will be apparent from the written description and the drawings in which:

FIG. 2 is a cutaway sectional view taken on the line 2—2 of FIG. 1;

FIG. 3 is a sectional view of the valve mechanism in accordance with the present invention;

DESCRIPTION OF THE PREFERRED EMBODIMENTS

Figure 1:
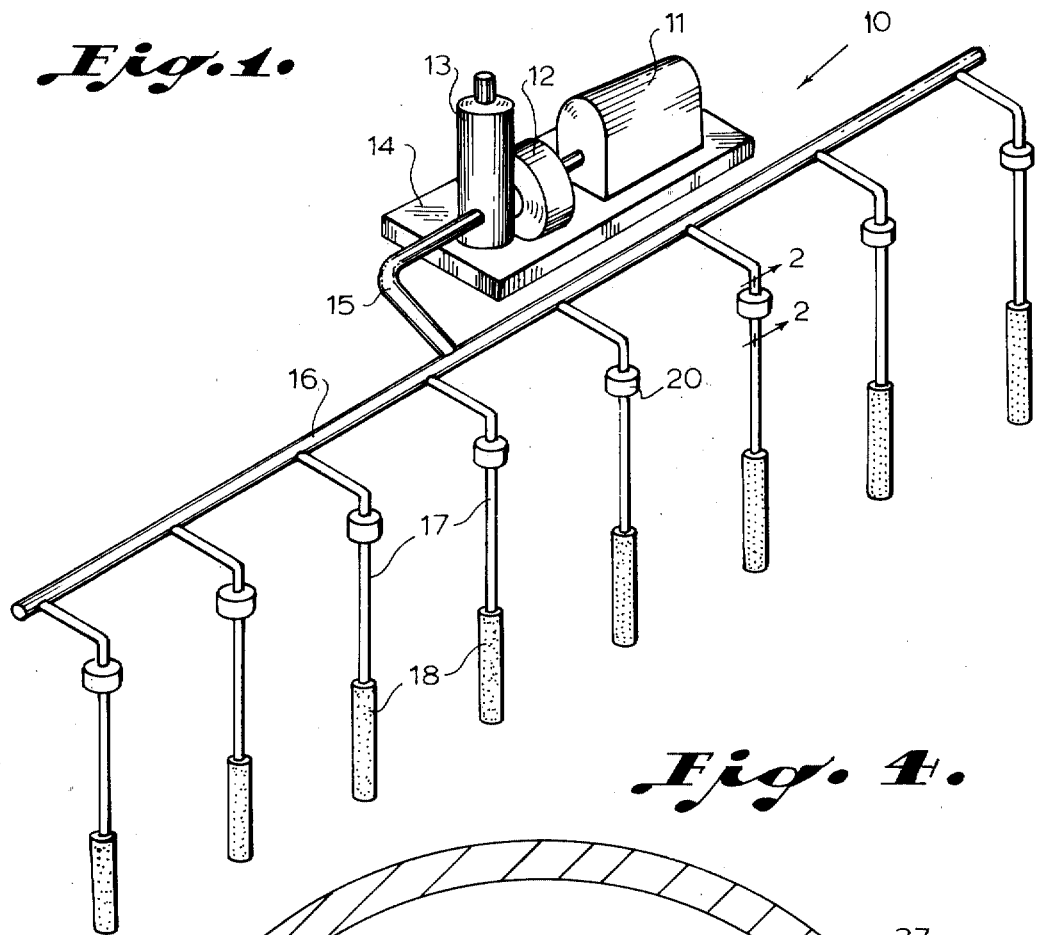
FIG. 1 illustrates a perspective view of a well point system having automatic tuning valves located in each riser.

Referring to FIG. 1 of the drawings, a conventional well point system 10 is illustrated having a pumping motor 11 driving a pump 12 and a conventional priming device 13 mounted on a base 14. The priming device is connected by means of a line 15 to a well point manifold 16 which is connected to a plurality of risers 17 being connected to a plurality of well points 18 located below the surface of the earth. Each riser 17 has an automatic well point tuning valve 20 located within the riser. In operation, each well point 18 is sunk to a predetermined depth surrounding an excavation and has a riser 17 connecting the well point to the manifold 16 into the pumping system for pumping water from the earth surrounding the excavation to keep the excavation area de-watered.

FIG. 2 illustrates the automatic shutoff valve 20 having an input line 21 and an output line 22. The lines 21 and 22 are connected to the main valve casing 24. The input line 21 and output line 22 are each connected to one side of the riser 17 of FIG. 1. A wall 23 is mounted in the casing 24 and attached to the sides of the casing by a combination of adhesive and screws 25; even-though, it will be clear that the wall 23 can be attached to the casing 24 in any manner desired including having the casing and wall molded as one intergal unit. Wall 23 has an opening or valve port 26 and a second opening or valve port 27 passing therethrough, as well as an air bleed 28. The air bleed 28 might be 1/10,000 of an inch in diameter so as to bleed from two to five cubic inches per minute of air through the wall 23. A rocker arm support 30 may be attached to the wall 23 by screw 31 and adhesive but can be attached in any manner desired without departing from the spirit and scope of the invention. The rocker arm support 30 has a yoke 31 on one end thereof with a pivot pin 32 connecting rocker arm 33 thereto in a manner that rocker arm 33 can pivot on the pin 32. The float supporting arm 34 is pinned with a pin 35 to the rocker arm 33 and supports a float 36 on the opposite side of the wall 23 from the rocker arm 33 by passing through the opening 26. Float 36 has a base member 37, sides 38, and a top 40 having a weight 39 attached thereto with the top 40 connected by nuts 41 to a threaded portion of the arm 34. A valve seat member 42 is also attached to the arm 34 by a nut 43 and locked in place by a lock nut 44. Valve seat 42 has a soft rubber washer 45 for sealing the port 26 when the valve seat 42 and washer 45 are pulled against the top of a lip 49 of the wall 23 responsive to the float 36 dropping thereby rocking rocker arm 33 on the pivot pont 32. This in turn pulls a valve element arm 46 pinned by pin 47 to the opposite end of the rocker arm 33 from the pin 35. Arm 46 has a threaded portion 48 and passes through the opening 27 in wall 23. A valve element 50 is held by a nut 51 and locked by a lock nut 52 attached to the threaded portion 48 of the arm 46 and located on the opposite side of the wall 23 from the rocker arm 33. A soft rubber washer seal 53 is supported by the valve seat 50 for sealing the port 27 when the float 36 drops rocker arm 33 to pull valve element 42 down onto port 26 lip 59 and valve element 50 upward onto the port 27. Port 27 is larger than port 26 and the arm 33 is pinned at 32 to provide additional leverage to the valve element 50. It will of course be clear that the valve elements 42 and 50 must be adjusted for a close coacting action to seal the ports 26 and 27; and these adjustments may be quickly and easily made by virtue of the nuts 43 and 51.

Figure 4:
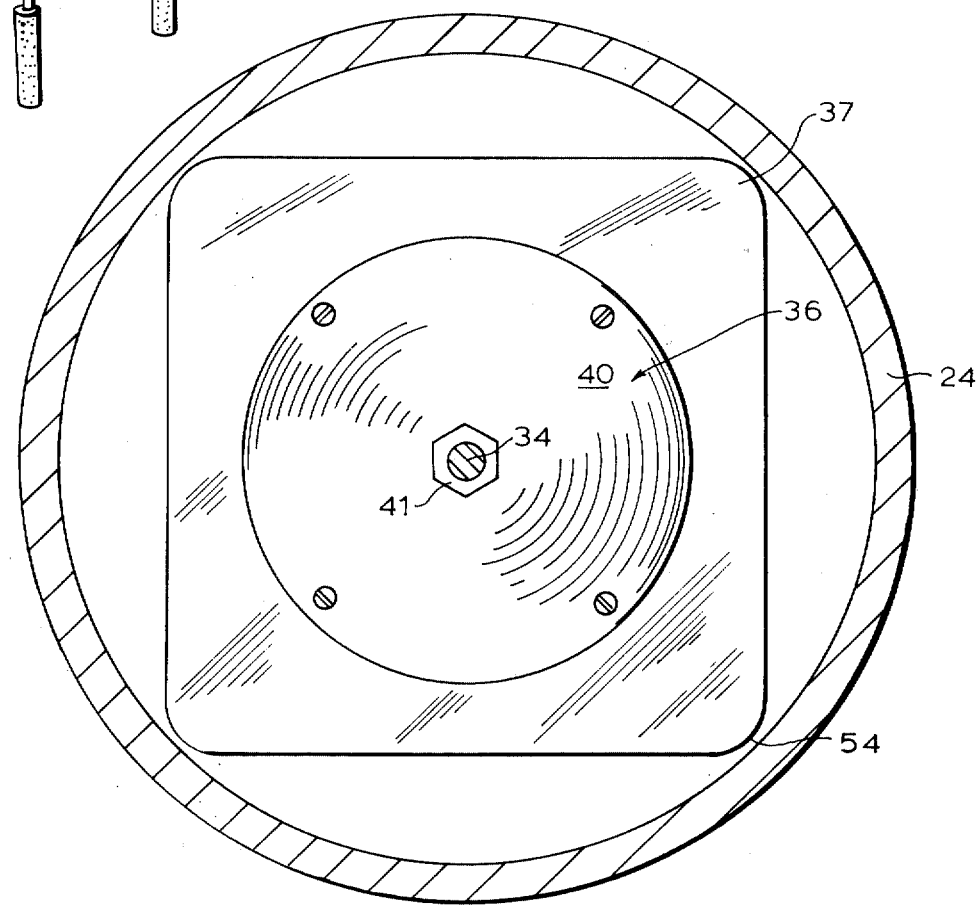
FIG. 4 is a sectional view taken on the line 4—4 of FIG. 2.

The base 37 of the float 36 is square with rounded corners as illustrated in FIG. 4 and protrudes beyond the cylindrical shaped outer walls 38 of the float 36. The base 37 has the rounded corners 54 and is sized to allow a small spacing between the corners 54 and the inside of the casing 24; thus, maintaining the float 36 into a center alignment within the casing 24 preventing it from cocking to one side and locking the float without elaborate guides and alignment means for the float. FIG. 4 illustrates the float having the top 40 and having the arm 34 attached by nut 41.

FIG. 3 illustrates the operation of the valve mechanism of FIG. 2 having the casing 24 and wall 23 with the air bleed 28 therethrough along with the valve ports 26 and 27, rocker arm support 30 having a yoke 31 and pin 32 holding the rocker arm 33 which in turn has arms 46 and 34 pinned thereto with arm 34 supporting the float 36. This embodiment differs in that in place of valve elements 42 and 53 a valve element in the shape of a soft rubber sphere 55 is attached to the arm 34 held by nut 57 for closing the port 26 and a similar soft rubber sphere 58 is attached by a nut 60 to the arm 46 for sealing the port 27. The spherical shape of the valve 56 and 58, advantageously, allows complete sealing of the ports 26 and 27 by their natural conformance to the circular shape of the ports 26 and 27 and also provides a seal even as the valve elements wear from continued use. It should be clear at this point that the present well point tuning valve 20 in its normal operation will draw water through the riser 17, through the well point tuning valve 20, through the manifold 16 to the pump 12 and that the flow of water will generate the pressure for lifting the float 38 for opening the valve ports 26 and 27 to the flow of water. The water advantageously is flowing in the same direction as the float is being driven to maintain the float in an open position.

If a particular well point dries up the air being sucked into the valve 20 will allow the weight of the float 36 to drop the float thereby rocking the rocker arm 33 enclosing valve points 26 and 27 and preventing the rapid flow of air from interferring with the operation of the pump 12. If the well point 18 becomes surrounded by water, a slight air bleed 28 will generate just enough pressure from the float side of the wall 23 to gradually lift the water in a riser 17 until it actually lifts the float 26 whereupon the flow of water will then continue to drive the float to maintain the rocker arm to open the valves and the ports 26 and 27. The size of the air bleed is important inasmuch as the purpose of the valve is to prevent the flow of air on the one hand, yet must allow sufficient flow of air to generate sufficient pressure to reactivate a well point should the water level in the particular well point rise again. Generally, the limits of air that can be bled through the valve are within the range from 1/10 cubic inch per minute to 10 cubic inches per minute eventhough two cubic inches per minute would be more desirable figure.

Figure 5:
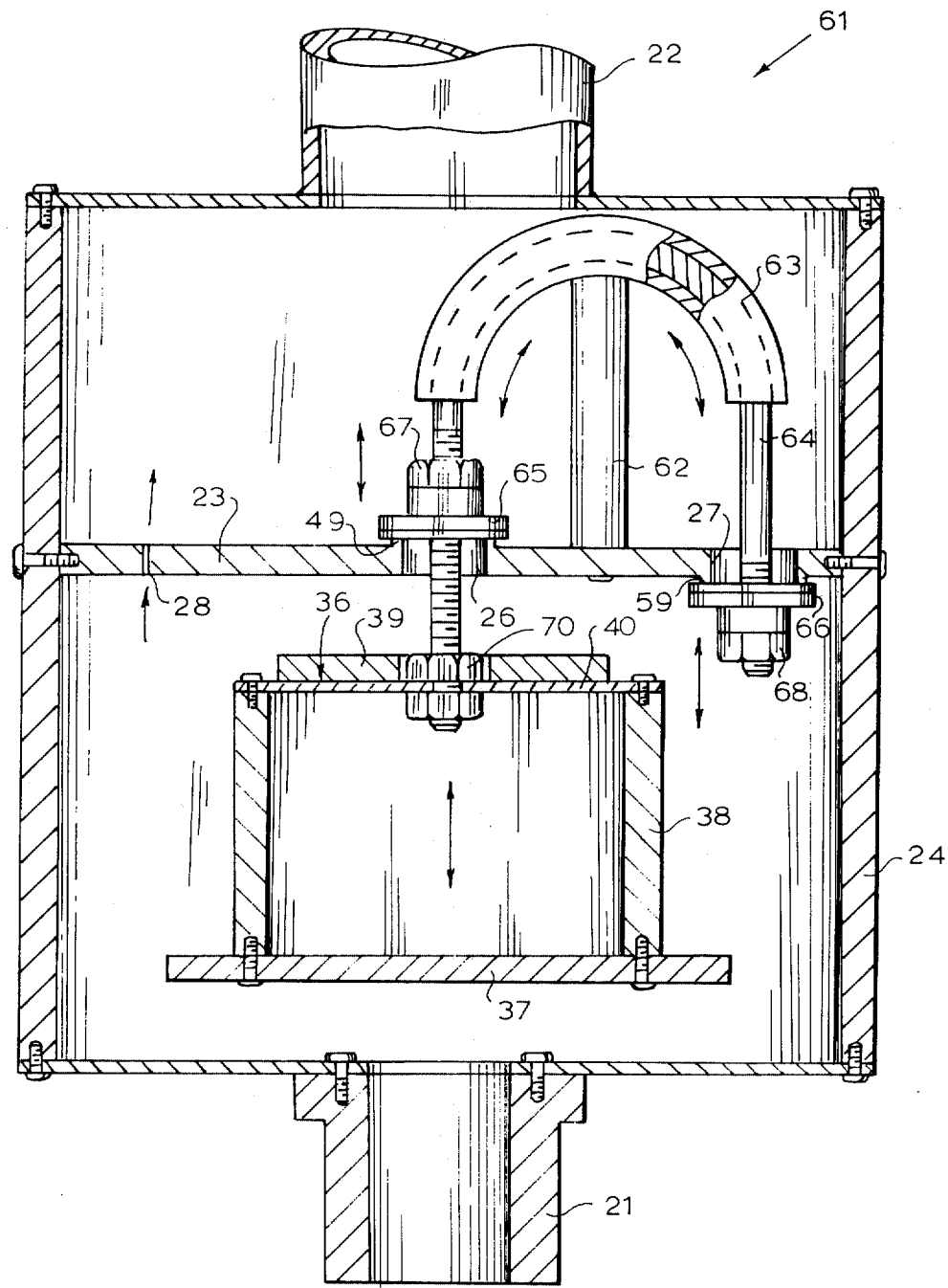
FIG. 5 is a cutaway section view of an alternate embodiment of a valve mechanism.

Referring now to FIG. 5, an alternate embodiment of the present invention is illustrated having input line 21 and output line 22 connected into the riser of a well point system and having the casing 24 having a wall 23 with an air bleed 28 therein. The system continues with a float 36 having a bottom guide member 37 and side walls 38 along with the top 40 and weight 39 attached thereto. This embodiment 61 has a center post 62 attached to the wall 23 and supporting an arcuate hollow member 63 attached to the top of center post 62. A flexible but stiff cable or plastic rod 64 slides through the passageway in hollow member 63 and has the float 36 attached by nuts 70 to one end thereof. The flexible rod 64 has a washer 65 anchored with an adjustment nut 67 attached thereto for covering the port 26 as well as a washer 66 adjusted by a nut 68 for covering the port 27. Thus, the flexible rod 64 slides in the arcuate hollow member 63 responsive to the movement of the float 36 for opening and closing the valve seats 65 and 66.

It should accordingly be clear at this point that a well point system having an automatic tuning valve for an automatic regulation of the flow of water through the well point risers has been provided. A typical valve can be made from a plastic or polymer casing along with non-corrosive components throughout. Lips 49 and 59 advantageously prevents soil from lodging under the valve seats when the valves are closed and thereby allowing air to leak past the valves. This invention is not, however, to be construed as limited to the particular forms disclosed herein which are to be regarded as illustrative rather than restrictive.

I claim:
1. A well point system comprising in combination: pumping means;
  a plurality of well points;
  a plurality of risers attached to said well points for connecting each said well point to said pumping means;
  a plurality of valves for substantially cutting off individual risers in the absent of the flow of water, each said valve having a casing having an opening in each end thereof and each said valve having a wall located in said casing between said openings in each end thereof and mounted to said casing, each said valve having a float actuated arm movably mounted inside said casing and a float located on one side of said wall and mounted to said float actuated mechanism, said valve also having a plurality of valve members mounted to said float actuated mechanism adapted to cover a plurality of openings through said wall in one position and to open a plurality of openings in said wall in a second position whereby moving said float actuated mechanism by said float will open and close said valve to the flow of water through said wall; and
  air bleed means for allowing air to escape through said wall whereby said air bleed allows sufficient pressure to lift water in a riser to actuate said valve.

2. A well point system in accordance with claim 1 in which each said valve wall located in said casing has at least two valve port openings therethrough and said float is connected by a float actuated mechanism float support arm through one said opening to a rocker arm and said float support arm has a valve member mounted thereto.

3. The well point system in accordance with claim 2 in which said valve member mounted to said float support arm is mounted on the opposite side of said wall from said float and said other valve port has a valve member mounted on an arm extending therethrough on the same side of said wall as said float.

4. The well point system in accordance with claim 3 in which said flow actuated mechanism rocker arm is mounted to a pivot base fixedly attached to said wall located in said casing.

5. The well point system in accordance with claim 4 in which said pivot base has a yoke on the end therof with said rocker arm pivotally pinned in said yoke.

6. The well point system in accordance with claim 5 in which said valve members are rigid discs having resilient sealing washers attached thereto.

7. The apparatus in accordance with claim 5 in which said valve members are resilient spheres.

8. The apparatus in accordance with claim 7 in which said float has a generally square base member for guiding said float in said casing as said float moves between positions.

9. The well point system in accordance with claim 8 in which said float base is square having rounded corners.

10. The apparatus in accordance with claim 1 in which said float actuated mechanism includes a flexible rod sliding in a hollow tube attached to the opposite side of said wall from said float.

11. The apparatus in accordance with claim 1 in which each have a protruding lip protruding into one side of said wall to form a valve seat for each said valve member.

12. An apparatus for the automatic regulation of the flow of fluid comprising in combination:
  a valve casing having openings in each end thereof;
  a wall located in said casing between the ends thereof and attached thereto, said wall having at least one valve port located therethrough;
  a rocker arm located at said casing and mounted to rocker therein;
  a float attached to said rocker arm said float being lifted in said casing by liquid therin and allowed to fall in the absence of liquid, thereby moving said rocker arm between first and second positions;
  a valve means located in said casing and attached to said rocker arm for rocking therewith for opening and closing at least one said valve port through said wall responsive to the movement of said float and rocker arm; and
  air bleed means for allowing air to pass through said wall irrespective of the position of said valve means whereby said air bleed prevents the complete sealing of said wall to the flow of air.

13. The apparatus in accordance with claim 12 in which said air bleed means is an opening in said wall located in said casing which allows between 1/10 cubic inch per minute to 10 cubic inches per minute of air to pass therethrough.

14. The apparatus in accordance with claim 13 in which said rocker arm is mounted to a rocker arm support base which is fixedly attached to said wall located in said casing.

15. The apparatus in accordance with claim 14 in which said rocker arm pivot base has a yoke on the end thereof and said rocker arm is pinned in said yoke to rock on said pin.

16. The apparatus in accordance with claim 15 in which said valve means includes a pair of arms attached to each end of said rocker arm and having a valve means attached thereto for opening and closing a pair of ports responsive to the rocking of said rocker arm.

17. The apparatus in accordance with claim 16 in which said float is attached to one valve seat means arm passing through one said valve port for actuating said rocker arm and valve seat means responsive to said float.

18. The apparatus in accordance with claim 17 in which said valve means includes a pair of resilient spheres mounted to a pair of arms attached to said rocker arm to rock therewith for opening and closing a pair valve ports.

19. The apparatus in accordance with claim 18 in which said float has a substantially square base member for aligning said float in said casing.

20. The apparatus in accordance with claim 19 in which said square base member has rounded corners.

21. The apparatus in accordance with claim 12 in which each said valve port in said wall has a protruding lip therearound for seating a valve means thereon.

* * * * *